(12) United States Patent
Spitzer et al.

(10) Patent No.: US 7,695,806 B2
(45) Date of Patent: Apr. 13, 2010

(54) MOULDING COMPOSITION FOR PRODUCING BIPOLAR PLATES

(75) Inventors: Martin Spitzer, Heitersheim (DE); Philip David Willis, Mumpf (CH); Gunnar Reitmajer, Freiburg (DE)

(73) Assignee: Duresco GmbH, Basel (CH)

( * ) Notice: Subject to any disclaimer, the term of this patent is extended or adjusted under 35 U.S.C. 154(b) by 0 days.

(21) Appl. No.: 11/710,427

(22) Filed: Feb. 26, 2007

(65) Prior Publication Data

US 2007/0185244 A1 Aug. 9, 2007

Related U.S. Application Data

(63) Continuation of application No. 10/477,850, filed as application No. PCT/EP02/04937 on May 6, 2002, now abandoned.

(30) Foreign Application Priority Data

May 14, 2001 (CH) .................................. 881/01

(51) Int. Cl.
  *B32B 27/26* (2006.01)
  *B32B 27/20* (2006.01)
  *B32B 27/38* (2006.01)
  *B29C 43/00* (2006.01)
  *B29C 45/00* (2006.01)
  *B29C 67/00* (2006.01)
  *C08K 3/04* (2006.01)
  *C08L 63/00* (2006.01)
  *B29C 35/00* (2006.01)

(52) U.S. Cl. ............... 428/323; 264/319; 264/328.1; 264/328.2; 264/330; 264/331.11; 428/332; 523/400; 523/440; 523/468

(58) Field of Classification Search ............ None
See application file for complete search history.

(56) References Cited

U.S. PATENT DOCUMENTS

| 4,217,401 | A |   | 8/1980 | Pellegri et al. |        |
|-----------|---|---|--------|-----------------|--------|
| 5,994,475 | A |   | 11/1999 | Roth et al.    |        |
| 2002/0037448 | A1 | * | 3/2002 | Fitts et al. | 429/34 |
| 2002/0055030 | A1 | * | 5/2002 | Okumura et al. | 429/34 |
| 2002/0107318 | A1 | * | 8/2002 | Yamada et al. | 524/495 |

FOREIGN PATENT DOCUMENTS

| EP | 1 029 893 | 8/2000 |
| JP | 63-142085 | 6/1988 |
| JP | 2001-216976 | 8/2001 |
| WO | 99/19389 | 4/1999 |
| WO | 00/25372 | 5/2000 |
| WO | 00/55234 | 9/2000 |

OTHER PUBLICATIONS

Technical Data Sheet for EpikoteTM Resin 828, provided by Hexion (2007).*
Machine translation of JP 2001-216976, provided by the JPO website, 2001.

* cited by examiner

*Primary Examiner*—Michael J Feely
(74) *Attorney, Agent, or Firm*—Wenderoth, Lind & Ponack, L.L.P.

(57) ABSTRACT

Compositions comprising (a) an epoxy resin, (b) a hardener for the epoxy resin, (c) a product of the reaction of a microgel containing carboxylic acid groups and a nitrogen-containing base, and (d) an electrically conducting filler combination comprising, based on the total amount of filler, at least 75% by weight of graphite, are particularly suitable for producing biopolar plates.

22 Claims, 1 Drawing Sheet

MOULDING COMPOSITION FOR PRODUCING BIPOLAR PLATES

This application is a Continuation application of U.S. Ser. No. 10/477,850, filed Nov. 14, 2003 (now abandoned), which is 371 application of PCT/EP02/04937, filed May 6, 2002, which claims foreign priority to Switzerland application 881/01, filed May 14, 2001.

The present invention relates to epoxy resin compositions comprising an electrically conducting filler mixture and the use of this composition for producing bipolar plates.

Moulding compositions with high thermal and electrical conductivity are increasingly gaining importance for specific applications in the electrical industry, for example in the production of bipolar plates for fuel cells.

WO 99/19389 describes hot-curable compositions comprising from 10 to 30% by weight of a low-viscosity resin and from 70 to 90% by weight of an electrically conducting filler. The compositions have good thermal and electrical conductivities, and also high cracking resistance. However, these moulding compositions can be produced only in the presence of solvents and/or using liquid resin-hardener components.

Mixtures of vinyl ester resins, graphite powder, and, where appropriate, reinforcing fibres are proposed in WO 00/25372 as composite materials for producing bipolar plates. In these systems no use of solvents if required; however, these products either have insufficient storage stability for practical use or have a hardening time which is too long for mass production. When the fuel cell is operating in a hot and humid climate, the unavoidable cleavage of the acid from the ester function causes additional problems with catalyst and membrane.

It was an object of the present invention to provide solvent-free, storage-stable, rapidly curing epoxy resin systems with high thermal and electrical conductivity which are capable of production by an efficient process (extrusion, calendering) in pellet form and, where appropriate, can be processed to give bipolar plates, in particular by the usual processes for epoxy moulding compositions (injection moulding, transfer moulding, compression moulding).

The particular challenge here is that an extremely high content of conducting fillers has to be added to achieve sufficiently good conductivity in the bipolar plates. At the same time, the fall-off in flowability of the moulding composition associated with rising filler content must not be permitted to restrict processability. Another factor which has to be considered here is that the flowability of a thermoset moulding composition can additionally be reduced prior to introduction into the final compression mould by any prior exposure to heat (e.g. extrusion, preplastification, residence time in injection moulding cylinder) due to the onset of the curing reaction. Although this can be counteracted by a general reduction in the curing rate, that would also reduce the curing rate at mould temperature. If the bipolar plates are to be capable of useful bulk production with curing times under one minute, high curing rate at mould temperature is a specific requirement.

Theoretically, the fall-off in flowability with rising filler content could be counteracted by using liquid or very low-viscosity resin components or hardener components, but this advantage is associated with a considerable series of disadvantages or new problems:

1. More difficult handling of the liquid components combined with a problematic homogenization step (homogeneous introduction of solid, insoluble components into liquid components, possible sedimentation problems) would result in a production process which overall demands markedly more resources in terms of both apparatus and time. In contrast, solids-only mixtures can be homogenized in commercially available high-speed mixers within a few seconds. Direct extruder processing is then possible. Indeed, in the ideal case the premixing process can be omitted entirely, since the solid components can also be metered directly into the extruder and mixed there.
2. As the content of liquid matrix components increases, experience has shown that exudation is to be expected from the matrix to a greater or lesser degree when using conventional compression processes and parameters, e.g. as described in DIN 7708 ("Rieselfäthige duroplastische Formmassen—Herstellung von Probekörpern und Bestimmung der Eigenschaften" [Free-flowing thermoset moulding compositions—production of test specimens and determination of properties]) or in ASTM D3123-72 ("Spiral Flow of Low-Pressure Thermosetting Moulding Compounds") at the appropriate pressures (>69 bar) and compression temperatures (150-190° C.). The matrix here is expelled from the mould itself and the surrounding filler through the parting surface of the mould, and at the parting surface this forms undesirable flash with its known associated disadvantages (increased adhesion tendency, need for mechanical post-treatment, material loss). At the same time, this loss of matrix causes a fall-off in mechanical properties, in extreme cases preventing removal of the moulding from the mould. In addition, a low-filler-content matrix layer at the surface of the moulding increases the contact resistance between two bipolar plates. On the other hand, lower pressures cause insufficient compaction, associated with air inclusions, increased shrinkage, and filling problems during the moulding process.
3. When the matrix comprises liquids, latency can generally be expected to be lower, and storage stability poorer.

It has now been found that the required property profile can also be achieved without the use of liquid matrix components and the disadvantages associated with these, by simultaneous use of specific microgel-amine catalysts and specialized grades of graphite.

The present invention therefore provides a composition comprising
(a) an epoxy resin,
(b) a hardener for the epoxy resin,
(c) a product of the reaction of a microgel containing carboxylic acid groups and a nitrogen-containing base, and
(d) an electrically conducting filler combination comprising, based on the total amount of filler, at least 75% by weight of graphite.

Figure 1:
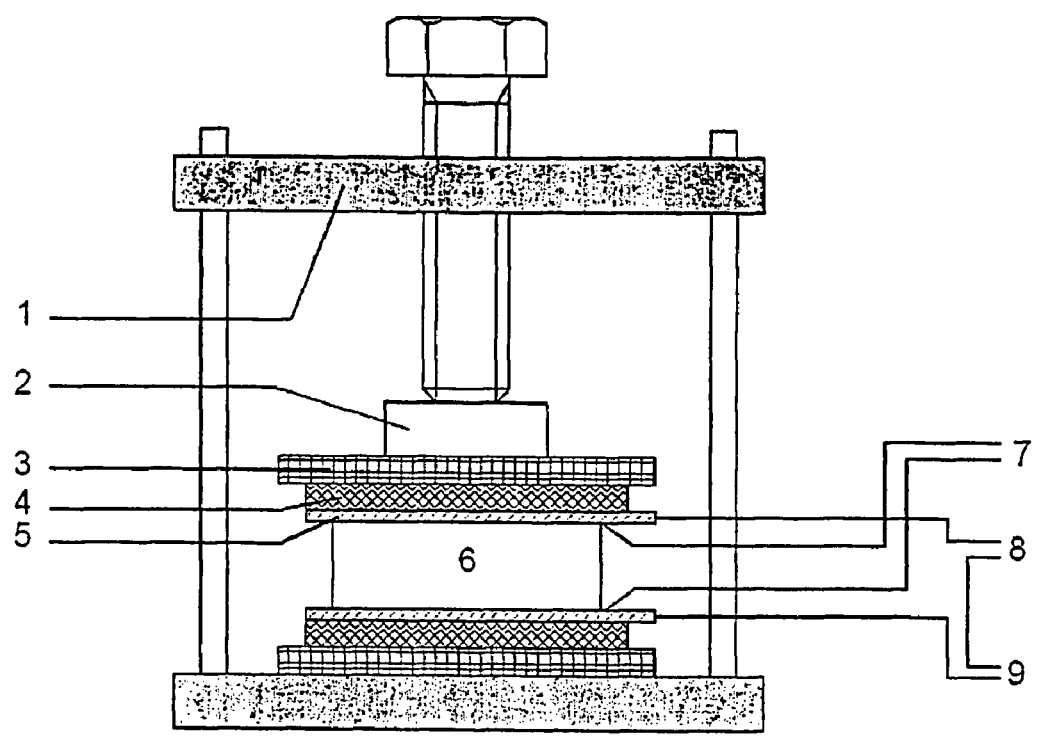
FIG. 1 shows a diagram of a test assembly for determining volume resistivity.

A suitable component (a) for preparing the compositions of the invention is the usual epoxy resins from epoxy resin technology. Examples of epoxy resins are:

I) Polyglycidyl and poly(β-methylglycidyl) esters, obtainable by reacting a compound having at least two carboxyl groups in the molecule and epichlorohydrin or β-methylepichlorohydrin. The reaction usefully takes place in the presence of bases.

The compound used having at least two carboxyl groups in the molecule may be an aliphatic polycarboxylic acid. Examples of these polycarboxylic acids are oxalic acid, succinic acid, glutaric acid, adipic acid, pimelic acid, suberic acid, azelaic acid, and dimerized or trimerized linoleic acid.

However, it is also possible to use cycloaliphatic polycarboxylic acids, such as tetrahydrophthalic acid, 4-methyltetrahydrophthalic acid, hexahydrophthalic acid, or 4-methylhexahydrophthalic acid.

Aromatic polycarboxylic acids may also be used, for example phthalic acid, isophthalic acid or terephthalic acid.

II) Polyglycidyl or poly(β-methylglycidyl)ethers, obtainable by reacting a compound having at least two free alcoholic hydroxy groups and/or phenolic hydroxy groups with epichlorohydrin or β-methylepichlorohydrin under alkaline conditions or in the presence of an acidic catalyst with subsequent treatment with alkali.

These glycidyl ethers derive from acyclic alcohols, for example, e.g. from ethylene glycol, diethylene glycol or higher polyoxyethylene glycols, or propane-1,2-diol or polyoxypropylene glycols, or propane-1,3-diol, butane-1,4-diol, polyoxytetramethylene glycols, pentane-1,5-diol, hexane-1,6-diol, hexane-2,4,6-triol, glycerol, 1,1,1-trimethylolpropane, pentaerythritol, or sorbitol, or else from polyepichlorohydrins.

Other glycidyl ethers of this type derive from cycloaliphatic alcohols, such as 1,4-cyclohexanedimethanol, bis(4-hydroxycyclohexyl)methane or 2,2-bis(4-hydroxycyclo-hexyl)propane, or from alcohols which contain aromatic groups and/or other functional groups, for example N,N-bis (2-hydroxyethyl)aniline or p,p'-bis(2-hydroxyethylamino) diphenylmethane.

The glycidyl ethers may also be based on mononuclear phenols, such as resorcinol or hydroquinone, or on polynuclear phenols, such as bis(4-hydroxyphenyl)methane, 4,4'-dihydroxybiphenyl, bis(4-hydroxyphenyl) sulphone, 1,1,2,2-tetrakis(4-hydroxyphenyl)ethane, 2,2-bis(4-hydroxyphenyl)propane or 2,2-bis(3,5-dibromo-4-hydroxyphenyl)propane.

Other hydroxy compounds suitable for preparing glycidyl ethers are novolaks, obtainable by condensation of aldehydes, such as formaldehyde, acetaldehyde, chloral or furfuraldehyde, with phenols or bisphenols which are unsubstituted or have substitution by chlorine atoms or by $C_1$-$C_9$-alkyl groups, for example phenol, 4-chlorophenol, 2-methylphenol, or 4-tert-butylphenol.

III) Poly(N-glycidyl) compounds, obtainable by dehydrochlorination of the products of the reaction of epichlorohydrin with amines which contain at least two amine hydrogen atoms.

Examples of these amines are aniline, n-butylamine, bis(4-aminophenyl)methane, m-xylylenediamine, and bis(4-methylaminophenyl)methane.

The poly(N-glycidyl) compounds also include triglycidyl isocyanurate, N,N'-diglycidyl derivatives of cycloalkyleneureas, such as ethyleneurea or 1,3-propyleneurea, and diglycidyl derivatives of hydantoins, for example of 5,5-dimethylhydantoin.

IV) Poly(S-glycidyl) compounds, such as di-S-glycidyl derivatives which derive from dithiols, such as ethane-1,2-dithiol or bis(4-mercaptomethylphenyl) ether.

V) Cycloaliphatic epoxy resins, such as bis(2,3-epoxycyclopentyl)ether, 2,3-epoxycyclopentyl glycidyl ether, 1,2-bis (2,3-epoxycyclopentyloxy)ethane or 3,4-epoxycyclohexylmethyl-3',4'-epoxycyclohexanecarboxylate.

It is also possible to use epoxy resins in which the 1,2-epoxy groups have been bonded to different heteroatoms or functional groups; examples of these compounds are the N,N,O-triglycidyl derivative of 4-aminophenol, the glycidyl ether glycidyl ester of salicylic acid, N-glycidyl-N'-(2-glycidyloxypropyl)-5,5-dimethylhydantoin and 2-glycidyloxy-1,3-bis (5,5-dimethyl-1-glycidylhydantoin-3-yl)propane.

To prepare the epoxy resin compositions of the invention it is preferable to use a solid polyglycidyl ether or solid polyglycidyl ester, in particular a solid dig lycidyl bisphenol ether or a solid dig lycidyl ester of a cycloaliphatic or aromatic dicarboxylic acid, or a cycloaliphatic epoxy resin. It is also possible to use mixtures of epoxy resins.

It is preferable to use solid ether-based epoxy resins.

Solid polyglycidyl ethers which may be used are compounds whose melting points are from above room temperature to about 250° C. The melting points of the solid compounds are preferably in the range from 50 to 150° C. These solid compounds are known, and some of them are available commercially. The advanced products obtained by prior extension of liquid polyglycidyl ethers may also be used as solid polyglycidyl ethers.

Particularly preferred components (a) are epoxy phenol novolaks and epoxy cresol novolaks.

In principle, any of the hardeners known to the person skilled in the art from epoxy resin technology may be used as component (b).

Preferred hardeners are phenol novolaks and cresol novolaks.

The products of the reaction of a microgel containing carboxylic acid groups and a nitrogen-containing base (microgel-amine salts) to be used as component (c) are known from U.S. Pat. No. 5,994,475.

The microgel in component (c) is preferably a copolymer of at least one unsaturated carboxylic acid, in particular acrylic acid or methacrylic acid, and at least one polyfunctional crosslinker.

To prepare the microgels in component (c) use is preferably made of a polyfunctional acrylate or methacrylate of an aliphatic, cycloaliphatic or aromatic polyol, an addition product of acrylic acid or methacrylic acid and a polyglycidyl compound, an addition product of acrylic acid or methacrylic acid and glycidyl acrylate or methacrylate, an alkenyl acrylate or alkenyl methacrylate, a dialkenylcyclohexane, or a dialkenylbenzene as polyfunctional crosslinker.

Particularly preferred polyfunctional crosslinkers are ethylene glycol diacrylate, ethylene glycol dimethacrylate, propylene glycol diacrylate, propylene glycol dimethacrylate, 1,4-butanediol diacrylate, 1,4-butanediol dimethacrylate, polyethylene glycol diacrylate, polyethylene glycol dimethacrylate, polypropylene glycol diacrylate, polypropylene glycol dimethacrylate, 1,1,1-trimethylolpropane triacrylate, 1,1,1-trimethylolpropanetrimethacrylate, bisphenol A diglycidyl ether diacrylate, bisphenol A diglycidyl ether dimethacrylate, allyl acrylate, allyl methacrylate, divinylcyclohexane, and divinylbenzene.

The nitrogen-containing base used in preparing component (c) is preferably an amine, a polyamine or in particular an imidazole.

Particularly preferred nitrogen-containing bases are 2-phenylimidazole, 2-isopropylimidazole, 2-dodecylimidazole, 2-heptadecylimidazole, 2-ethylimidazole, and 2-ethyl-4-methylimidazole.

The electrically conducting filler combination (d) of the composition of the invention may be composed of pure graphite or of a mixture with other mineral or metallic fillers or carbon blacks, as long as the proportion of the graphite in the entire filler combination (d) is at least 75% by weight, preferably at least 85% by weight, particularly preferably at least 95% by weight.

The particle diameter of the filler is also significant.

The graphite powder used has an average particle diameter of from 0.1 to 500 μm, more preferably from 1 to 300 μm, particularly preferably from 10 to 250 μm, with particular preference from 50 to 100 μm. Graphite has a layer structure, the electrons flowing along these layers. When moulded plates are produced, as particle size increases these layers become oriented in the plane, so that electrical conductivity in the plane of the plate is greater than across it.

It is preferable to use synthetic graphite, since it has less orientation. Unlike natural graphite, it also has only very low levels of contamination by divalent and trivalent cations which can become embedded into the membrane of the fuel cell and thus reduce performance.

The quantitative proportions of components (a), (b), (c) and (d) in the compositions of the invention may vary within wide ranges.

The quantitative proportion of epoxy resin (a) to hardener (b) is within the conventional ranges known to the person skilled in the art. Preference is given to compositions comprising from 20 to 75% by weight of component (b), based on 100% by weight of component (a).

The amount of component (c) is from 0.1 to 25% by weight, preferably from 1 to 20% by weight, based on 100% by weight of component (a).

The amount of filler combination (d) is from 50 to 90% by weight, preferably from 70 to 85% by weight, based on the entire composition of components (a)+(b)+(c)+(d).

The compositions of the invention may comprise other conventional additives, e.g. antioxidants, light stabilizers, plasticizers, dyes, pigments, agents with thixotropic effect, tougheners, antifoams, antistats, lubricants and mould-release agents. The content of the additives is included in the filler component (d).

Surprisingly, the electrical conductivity of the hardened epoxy resin can be considerably increased by adding an organosilane. Examples of suitable organosilanes are octyltriethoxysilane, methyltriethoxysilane, vinyltriethoxysilane, methyltrimethoxysilane, vinyltrimethoxysilane, γ-aminopropyltrimethoxysilane and γ-glycidyloxypropyltrimethoxysilane.

The amount of the silane added is preferably from 0.05 to 1% by weight, in particular from 0.1 to 0.5% by weight, based on the entire composition.

As the proportion of graphite in the formulation rises, the mechanical properties of the cured resin become poorer. The use of fibrous fillers to increase mechanical strength is known from the literature. However, as described in WO 00/25372, for example, when fibrous fillers are added it has to be accepted that there will be loss of surface quality, poorer processability of the moulding composition, and the risk of orientation of the fibres, particularly in large-surface-area applications, e.g. in the case of bipolar plates.

The property profile of the epoxy matrix has been found to be sufficiently good that even when the proportion of components (a)+(b)+(c) is only from 15-30% by weight the strengths obtained permit reliable handling of the plates during removal from the mould and assembly of the fuel cells. The omission of fibrous fillers permits the moulding of very fine structures with extremely good surface quality.

The hardening of the epoxy resin compositions of the invention to give mouldings, coatings or the like takes place in the manner usual in epoxy resin technology, as described by way of example in "Handbook of Epoxy Resins", 1967, by H. Lee and K. Neville.

The invention also provides the electrically conductive material produced by hardening a composition of the invention.

The compositions of the invention are suitable as replacements for metal in electrical applications and are particularly suitable for producing bipolar plates for fuel cells.

Large numbers of bipolar plates are needed for producing PEM fuel cells. In order to have the capability for manufacturing these numbers cost-efficiently, the production process has to be capable of being run with very short cycle time and a high level of automation. High latency of the moulding composition is required to achieve this property profile.

The examples below use the following components:

| | |
|---|---|
| Epoxy resin 1: | Epoxy cresol novolak with 4.35 val/kg epoxy content |
| Epoxy resin 2: | Bisphenol A diglycidyl ether with 2.2 val/kg epoxy content |
| Hardener 1: | Cresol novolak with 8.5 val/kg hydroxy group content |
| Catalyst 1: | Microgel-amine salt prepared from methyl methacrylate, methacrylic acid, ethylene glycol dimethacrylate, trimethylolpropane trimethacrylate and 2,4-ethylmethylimidazole, prepared as in Example 11.5 of U.S. Pat. No. 5,994,475 |
| EMI | 2,4-Ethylmethylimidazole |

Graphite powder with an average particle diameter of 20 μm.

The compositions of the invention (see Example 1) have high latency at temperatures of from 60 to 110° C. This is important, since the composition has to be heated to these temperatures for preplastification during processing. At the same time, since the high filler level in itself gives the composition high viscosity, any further increase in viscosity has to be avoided in order to ensure sufficient flowability during mould filling. To simulate this behaviour during processing of the moulding composition, the pellets of moulding compositions from Example 1 were conditioned for 3 and 6 minutes on a calender at two different temperature settings, and the changes in spiral flow path were compared. Table 1 clearly shows that while there is from 30 to 40% fall-off from the initial flowability of EMI-containing products, the flowability of which is relatively poor even at the outset, the figure is only from 13 to 15% when microgel catalysis is used. In practice this means that in the case of conventionally accelerated moulding compositions even small interruptions in production have a significant effect on the quality of the bipolar plate. One of a number of disadvantages of moulding compositions with poor flowability is that they cannot be adequately compacted, and this can lead to loss of the gas-tight property of the plate, which is a prime requirement for reliable operation of the PEM fuel cell.

EXAMPLE 1

Flowability and Latency

The components given in Table 1 are mixed in a bead mill and homogenized at from 90 to 110° C. on a calender. The flowability of the resultant pellets is then determined to ASTM D3123.

TABLE 1

| | A (invention) | B (comparison) |
|---|---|---|
| Component | | |
| a) Epoxy resin 1 | 13.37 | 13.37 |
| a) Epoxy resin 2 | 8.69 | 8.69 |
| b) Hardener 1 | 9.64 | 9.64 |

TABLE 1-continued

|  | A (invention) | B (comparison) |
|---|---|---|
| c) Catalyst 1 | 1.80 | |
| EMI (comparison) | | 0.38 |
| d) Graphite powder (20 μm) | 65.0 | 66.42 |
| d) Calcium stearate | 0.50 | 0.50 |
| d) Hoechst OP 125 U wax | 1.00 | 1.00 |
| Total | 100 | 100 |
| Spiral flow 170° C. [inch/cm] with calender mixing for 3 minutes (rear/front roll) | | |
| at 90/100° C. | 20.0/50.8 | 13.5/34.3 |
| 100/110° C. | 18.0/45.7 | 9.75/24.8 |
| for 6 minutes (rear/front roll) | | |
| at 90/100° C. | 17.25/43.8 | 8/20.3 |
| 100/110° C. | 15.5/39.4 | 6.75/17.1 |

EXAMPLE 2

Volume Resistivity

The effect of organosilanes on the Volume resistivity of the hardened mixtures is apparent when comparing compositions C and D. The quantitative data for components in Table 2 are parts by weight.

TABLE 2

| Component | C | D |
|---|---|---|
| a) Epoxy resin 1 | 11.47 | 11.47 |
| a) Epoxy resin 2 | 7.46 | 7.46 |
| b) Hardener 1 | 8.27 | 8.27 |
| c) Catalyst 1 | 1.80 | 1.80 |
| d) Sikron B 300 powdered quartz | 9.50 | 9.30 |
| d) PPG EC10 | 5.00 | 5.00 |
| d) Graphite powder (20 μm) | 55.00 | 55.00 |
| d) γ-glycidyloxypropyltrimethoxysilane | | 0.20 |
| d) Calcium stearate | 0.50 | 0.50 |
| d) Hoechst OP 125 U wax | 1.00 | 1.00 |
| Volume resistivity [ohm cm] | 0.305 | 0.218 |

Figure 2:
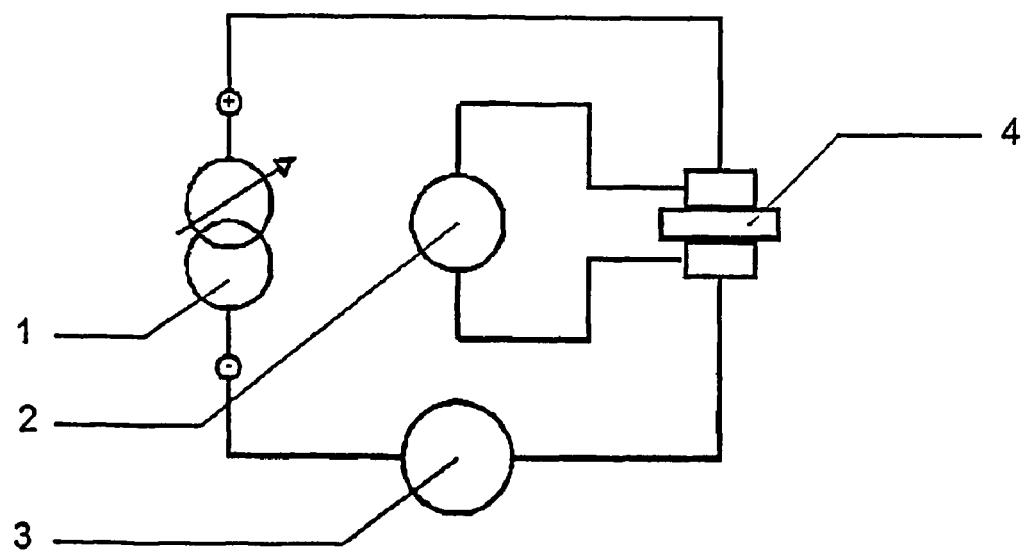
FIG. 2 shows an electrical circuit diagram of a 4-point conductivity measurement system.

The current state of the art requires volume resistivities of <0.1 ohm cm for the bipolar plate in order to avoid any adverse effect on the performance of the fuel cell. Measurements are typically made on round specimens (pressings) of diameter 3.5 cm and thickness at least 1.5 cm. Since the method is greatly dependant on the area of contact between electrode and pressing, pressure is applied to the specimen in stages of from 1 to 5 N/mm². The change in the values can be evaluated as a criterion of quality of the surface of the pressing. If the intention is to eliminate the effect of unevenness on electrical conductivity, a flexible graphite mat may be placed between electrode and pressing. FIG. 1 shows a diagram of an appropriate test assembly for determining volume resistivity. The reference numerals in the figure indicate: 1=holder, 2=load cell, 3=insulator, 4=graphite mat, 5=contact, 6 specimen, 7=voltmeter, 8=ammeter and 9=power source. The principle of measurement used here is shown in FIG. 2 in the form of an electrical circuit diagram of a 4-point conductivity measurement system. The reference numerals in FIG. 2 indicate: 1 =power source, 2=test specimen, 3=ammeter and 4=voltmeter.

Table 3 below shows that high graphite contents are needed to achieve these low resistances. The reduction in volume resistivity is unfortunately also associated with a fall-off in flowability. This effect is also apparent from Table 3. The quantitative data for the components in Table 3 are parts by weight.

TABLE 3

| Component | E | F | G | H |
|---|---|---|---|---|
| Epoxy resin 1 | 15.48 | 13.37 | 11.26 | 9.15 |
| Epoxy resin 2 | 10.06 | 8.69 | 7.32 | 5.95 |
| Hardener 1 | 11.16 | 9.64 | 8.12 | 6.60 |
| Catalyst 1 | 1.80 | 1.80 | 1.80 | 1.80 |
| Graphite powder (20 μm), synthetic | 60.00 | 65.00 | 70.00 | 75.00 |
| Calcium stearate | 0.50 | 0.50 | 0.50 | 0.50 |
| Hoechst OP 125 U wax | 1.00 | 1.00 | 1.00 | 1.00 |
| Total | 100.00 | 100.00 | 100.00 | 100.00 |
| Volume resistivity [ohm cm] | 1.09 | 0.37 | 0.22 | 0.13 |
| Spiral flow [inch] | 29.5 | 17.5 | 11.0 | 5.0 |

Selection of graphite grades:

Suitable granulometry of component (d) can optimize spiral flowability and the conductivity of the formulation. Synthetic graphites should mainly be utilized here, since natural graphites comprise from 1 to 3% of polyvalent cations which can become embedded in the membrane to adverse effect. Table 4 below shows the volume resistivities of the above formulation G (Table 3) as a function of the grade of graphite used. The data in brackets are the average particle diameter of the graphite.

TABLE 4

| Example | Grade of graphite | Volume resistivity [ohm cm] | Spiral flow (170° C.) [inch/cm] |
|---|---|---|---|
| G | Synthetic (20 μm) | 0.22 | 11.0/27.9 |
| H | Synthetic (50 μm) | 0.14 | 23.0/58.4 |
| I | Synthetic (60 μm) | 0.08 | 14.5/36.8 |
| J | Synthetic (100 μm) | 0.12 | 22.0/55.9 |
| K | Synthetic (250 μm) | 0.18 | 30.5/77.5 |
| L | Synthetic (500 μm) | 0.16 | 31.0/78.7 |
| M | Natural flakes (50 μm) | 0.17 | 21.0/53.3 |
| N | Natural flakes (100 μm) | 0.19 | 25.0/63.5 |
| O | Natural flakes (250 μm) | 0.10 | 34.0/86.4 |
| P | Natural flakes (300 μm) | 0.16 | 31.0/78.7 |

The flowability of these formulations naturally increases with rising particle size of the graphite (see Table 4), but in parallel with this there is also impairment of the surface quality of the hardened moulding compositions. The tendency of the moulding composition to form flash increases, and the requirement for post-treatment operations therefore increases.

According to Table 4 the maximum electrical conductivity results from use of a synthetic grade of graphite with an average particle size of about 60 μm. A proportion of 73% by weight, based on the entire composition of components (a)+(b)+(c)+(d), proved here to be the ideal compromise between conductivity and flowability. If the flowability of this optimized formulation is now compared with an EMI-catalyzed variant of the same formulation, it is again found that the use of EMI gives insufficient processability due to lack of adequate flowability (Examples S and T). To this end, the formulations were homogenized for 3 and 4 minutes on a mixing calender with roll temperatures of 100/110° C.

The spiral flow paths for the EMI-catalyzed Example I halved after as little as 4 minutes, whereas only a small fall-off from 10 to 9 inches (from 25.4 to 22.9 cm) is found for the microgel variants (Examples Q and R). See Table 5 below.

The selection of process parameters on the calender is such that the flow properties (spiral path) for the moulding composition are similar to those for an extrusion process. Satisfactory processing becomes impossible if the spiral path after the mixing process is ≦5 inches (12.7 cm). Depending on the latency behaviour of the composition, this value increases if the composition is subject to other heating effects (e.g. pre-plastification for the compression process) prior to the actual application process.

TABLE 5

| Component | Q (3 min) | R (4 min) | S (3 min) | T (4 min) |
|---|---|---|---|---|
| a) Epoxy resin 1 | 9.99 | 9.99 | 10.14 | 10.14 |
| a) Epoxy resin 2 | 6.50 | 6.50 | 6.59 | 6.59 |
| b) Hardener 1 | 7.21 | 7.21 | 7.32 | 7.32 |
| c) Catalyst 1 | 1.80 | 1.80 | | |
| EMI (comparison) | | | 0.39 | 0.39 |
| d) Graphite powder (60 µm), synthetic | 73.00 | 73.00 | 74.06 | 74.06 |
| d) Calcium stearate | 0.50 | 0.50 | 0.50 | 0.50 |
| d) Hoechst OP 125 U wax | 1.00 | 1.00 | 1.00 | 1.00 |
| Total | 100 | 100 | 100 | 100 |
| Volume resistivity [ohm cm] | 0.05 | 0.05 | 0.05 | 0.05 |
| Spiral flow path [inch/cm] | 10/25.4 | 9/22.9 | 4/10.1 | 2/2.6 |

Properties of formulation Q are shown in Table 6 below:

TABLE 6

| Property of pellets | |
|---|---|
| Plasticorder B value 160° C. [Nm] | 1.2 |
| Plasticorder AD value 160° C. [sec] | 71 |
| Plasticorder B value 120° C. [Nm] | 4.6 |
| Plasticorder AD value 120° C. [sec] | 285 |
| Spiral flow II 170° C. [inch] | 10 |
| Shore D 170° C.-demouldability | 65; O.K. |
| General properties | |
| Density [g/cm$^3$] | 1.78 |
| Demouldability 1 mm plate | O.K. |
| Stability of 1 mm plate | O.K. |
| Shrinkage at 170° C. (%) | 0.16 × 0.15 |
| Mechanical properties | |
| Flexural strength [MPa] | 51 |
| Modulus of elasticity [GPa] | 16 |
| Elongation at break [%] | 0.35 |
| Impact strength [kJ/m$^2$] | 1.5 |
| Thermal properties | |
| Glass transition temperature [° C.] | 164 |
| Thermal conductivity [W/m · K] | >15 |
| Volume resistivity | |
| One plate without skin [ohm · cm] | 0.01-0.03 |
| One plate with original surface [ohm · cm] | 0.05 |

The invention claimed is:

1. A solvent-free composition consisting essentially of:
   (a) an epoxy resin,
   (b) a hardener for the epoxy resin,
   (c) a product of the reaction of a microgel containing carboxylic acid groups and a nitrogen-containing base, selected from the group consisting of an amine, a polyamine and an imidazole, and
   (d) an electrically conducting filler combination comprising, based on the total amount of filler, at least 75% by weight of graphite.

2. The composition according to claim 1, wherein component (a) is a solid ether-based epoxy resin.

3. The composition according to claim 1, wherein component (a) is an epoxy phenol novolak or an epoxy cresol novolak.

4. The composition according to claim 1, wherein the microgel in component (c) is a copolymer of at least one unsaturated carboxylic acid and at least one polyfunctional crosslinker.

5. The composition according to claim 4, wherein the unsaturated carboxylic acid is acrylic acid or methacrylic acid.

6. The composition according to claim 4, wherein the polyfunctional crosslinker is a polyfunctional acrylate or methacrylate of an aliphatic, cycloaliphatic or aromatic polyol, an addition product of acrylic acid or methacrylic acid and a polyglycidyl compound, an addition product of acrylic acid or methacrylic acid and glycidyl acrylate or methacrylate, an alkenyl acrylate or alkenyl methacrylate, a dialkenylcyclohexane, or a dialkenylbenzene.

7. The composition according to claim 4, wherein the polyfunctional crosslinker is selected from the group consisting of ethylene glycol diacrylate, ethylene glycol dimethacrylate, propylene glycol diacrylate, propylene glycol dimethacrylate, 1,4-butanediol diacrylate, 1,4-butanediol dimethacrylate, polyethylene glycol diacrylate, polyethylene glycol dimethacrylate, polypropylene glycol diacrylate, polypropylene glycol dimethacrylate, 1,1,1-trimethylolpropane triacrylate, 1,1,1-trimethylolpropanetrimethacrylate, bisphenol A diglycidyl ether diacrylate, bisphenol A diglycidyl ether dimethacrylate, allyl acrylate, allyl methacrylate, divinylcyclohexane, and divinylbenzene.

8. The composition according to claim 1, wherein the nitrogen-containing base is 2-phenylimidazole, 2-isopropylimidazole, 2-dodecylimidazole, 2-heptadecylimidazole, 2-ethyl imidazole, or 2-ethyl-4-methylimidazole.

9. The composition according to claim 1, wherein the filler combination (d) comprises graphite powder with an average particle diameter of from 0.1 to 500 µm.

10. The composition according to claim 9, wherein the filler combination (d) comprises graphite powder with an average particle diameter of from 1 to 300 µm.

11. The composition according to claim 10, wherein the filler combination (d) comprises graphite powder with an average particle diameter of from 10 to 250 µm.

12. The composition according to claim 11, wherein the filler combination (d) comprises graphite powder with an average particle diameter of from 50 to 100 µm.

13. The composition according to claim 1, wherein the filler combination (d) comprises graphite powder in the form of synthetic graphite.

14. The composition according to claim 1, wherein component (b) is provided at from 20 to 75 parts by weight, based on 100 parts by weight of component (a).

15. The composition according to claim 1, wherein component (c) is provided at from 0.1 to 25 parts by weight, based on 100 parts by weight of component (a).

16. The composition according to claim 1, wherein component (d) is provided at from 50 to 90% by weight, based on the entire composition of components (a)+(b)+(c)+(d).

17. The composition according to claim 16, wherein component (d) is provided at from 70 to 85% by weight, based on the entire composition of components (a)+(b)+(c)+(d).

18. The composition according to claim 1, further comprising an organosilane.

19. The composition according to claim 18, wherein the organosilane is provided at from 0.05 to 1 parts by weight, based on the entire composition.

20. The composition according to claim 19, wherein the organosilane is provided at from 0.1 to 0.5 parts by weight, based on the entire composition.

21. An electrically conductive material produced by hardening a composition according to claim 1.

22. A process for the production of bipolar plates comprising applying the technique of injection molding, transfer molding or compression molding to form a bipolar plate from the composition of claim 1.

* * * * *